3,002,018
SEPARATION OF ALIPHATIC ACIDS
Funston G. Lum, Richmond, Calif., assignor to California Research Corporation, San Francisco, Calif., a corporation of Delaware
No Drawing. Filed Sept. 22, 1958, Ser. No. 762,212
4 Claims. (Cl. 260—537)

This invention relates to a process for isolating and separating in the form of their full salts straight chain aliphatic dibasic acids from their branched chain isomers and more particularly to a novel method for removing pure sebacic acid from reaction mixtures containing sebacic acid, isomeric $C_{10}$ acids, such as 2,2'-diethyl adipic acid and 2-ethyl suberic acid, as well as certain $C_5$–$C_9$ monobasic acids.

U.S. Patent 2,749,364 discloses a method for the recovery of $C_{10}$ aliphatic dibasic acids from mixtures of salts of sebacic acid and other isomeric $C_{10}$ acids, together with small amounts of other acids, including monobasic carboxylic acids obtained by carbonation and hydrogenation of the dimetallo products formed by treating butadiene with finely dispersed sodium or potassium in a selected ether medium in the presence of a relatively small amount of polycyclic aromatic hydrocarbons and/or a solid attrition agent at a temperature preferably below 0° C. These $C_{10}$ dicarboxylic acids are obtained in the form of the full alkali metal salts, that is, salts in which both hydrogens of the acid groups have been replaced by an alkali metal cation, the term alkali metal cation also embracing the ammonium cation, as distinguished from the half or acid salt referred to as such.

In the practice of the aforesaid patent when using sodium as the metal, a typical mixture comprises the $C_{10}$ dicarboxylic acids in the form of the sodium salts, sodium salts of various monobasic $C_5$ and $C_9$ acids, small traces of hydrogenation catalysts, condensed polymeric acids, and about 15% sodium chloride. Further, in accordance with the teaching of that patent, benzene is added to the mixture in an amount about equal to 20% of the total volume of the aqueous reaction mixture, followed by addition of concentrated hydrochloric acid in amounts varying between 5 and 10% by volume of the aqueous mixture to the mixture so as to form the monosodium salts of sebacic acid and the isomeric $C_{10}$ acid product. The solution is then saturated with sodium chloride, whereupon there are formed a solid phase of monosodium sebacate and a liquid phase, having the monosodium isomeric $C_{10}$ acids and the other impurities concentrated, respectively, in the aqueous and benzene layers thereof. A mixture of the isomeric $C_{10}$ acids is later separated from the aqueous layer of the liquid phase, the composition of the mixture, known as "isosebacic" acid, being approximately,

| | Percent |
|---|---|
| Sebacid acid | 6–10 |
| 2,2'-diethyl adipic acid | 12–18 |
| 2-ethyl suberic acid | 72–80 |

The method of separation described in the aforesaid patent suffers from certain disadvantages which this invention is designed to remedy. The first disadvantage is the necessity of converting the alkali metal salts of sebacic acid and the isomeric $C_{10}$ acids to the mono-alkali metal salts, which requires initial accurate determination of the free alkali and total organic acid content and then controlled addition of mineral acid to convert full salts to the half salts. A second, and more important disadvantage in the prior art method, is the fact that the separations are incomplete. Although substantially pure sebacic acid can be obtained, a considerable amount of the sebacic acid originally present in the reaction mixture is not recovered but is found in the "isosebacic" acid. Sebacic acid is commercially more valuable than the "isosebacic" acid, and as a result, as complete a recovery of sebacic acid as possible is strongly desired. Furthermore, in the event it is desired to separate the 2,2'-diethyl adipic acid from the 2-ethyl suberic acid, which are both contained in the "isosebacic" acid mixture, it is advantageous to effect such separation in the absence of sebacic acid contaminant, which being present makes the separation of the other fractions more difficult.

Accordingly, an object of the present invention is to provide a process for effecting separations such that one portion contains substantially pure sebacic acid and the other portion contains a mixture of various isomeric $C_{10}$ acids substantially free from the presence of sebacic acid.

It has been discovered that the alkali metal salts of sebacic acid are substantially completely insoluble in concentrated and saturated aqueous solutions of the same alkali metal salts of isomeric $C_{10}$ acids, more specifically, mixtures composed primarily of 2,2'-diethyl adipic acid and 2-ethyl suberic acid. This is surprising, inasmuch as the alkali metal salts of sebacic acid are quite soluble in water alone.

Based on the foregoing discovery of the insolubility of the alkali metal salts of sebacic acid in the same alkali metal salts of isomeric $C_{10}$ acids, a process for separation of mixtures of these salts has been developed which comprises forming an intimate mixture of these salts with a quantity of water insufficient to dissolve all of the salts but fully sufficient to dissolve all of the alkali metal salts of the isomeric $C_{10}$ acids, separating a solid phase and a liquid phase, regenerating pure sebacic acid from the solid phase, and regenerating isomeric $C_{10}$ acids from the liquid phase. The method is peculiar to the separation of sebacic acid from its isomers. For example, it has been attempted experimentally to separate 2,2'-diethyl adipic acid from 2-ethyl suberic acid by means of the methods employed in this invention. Such a separation has proved to be totally ineffective.

The method of forming the separable mixture is not critical. For example, one method that may be used to form a separable mixture is to dissolve in water a mixture of the alkali metal salts of sebacic acid and the isomeric $C_{10}$ acids so as to form a homogeneous solution. The solution is then evaporated until it contains about 40 to 70% by weight of the alkali metal salts of the isomeric $C_{10}$ acids. At the higher concentrations, substantially all of the alkali metal sebacate present is fully precipitated. The precipitate is then separated from the mother liquor by conventional means such as by filtration, decantation, centrifuging and the like. The precipitate is then washed with small portions of a saturated solution of an inorganic salt of the same alkali metal with higher molar solubility than the sebacate to remove any alkali metal salts of the isomertic acids which may cling to it. If desired, a water miscible alcohol or its water mixture may be employed in place of the saturated salt solution as a wash. The amount of water in such alcohol water mixtures should be kept low so that the solvency for the sebacate salt is poor.

The initial filtrate is combined with the washes and a mixture of isomeric $C_{10}$ acids substantially free of sebacic acid can be recovered by conventional means.

If the acids themselves rather than the alkali metal salts are available, they can be neutralized with a volume of alkali metal base, such as sodium, ammonium, or potassium hydroxide, sufficient to form the alkali metal salts and the separation process then carried out as indicated above.

If the alkali metal salts of sebacic acid and the isomeric $C_{10}$ acids are present as solids, a more convenient manner in which to make the separation is to add the mixture of salts to a volume of water insufficient to dissolve the alkali metal salt of the sebacic acid but fully sufficient to dissolve all of the isomeric $C_{10}$ acids. The salts are added with stirring and a separation is effected. For the sodium salts, this complete separation occurs when the mother liquor contains approximately 40% or higher of the isomeric $C_{10}$ acids by weight. With the potassium and ammonium salts slightly higher concentrations are necessary to effect substantially complete separation.

The separation proceeds quite smoothly at room temperatures, although any convenient temperature range may be employed. At higher temperatures, the separation has to be carried out at higher salt concentrations because of their increased solubilities.

This invention can better be illustrated by the following examples, which, however, are not meant to limit it:

*Example I*

A mixture having the following composition was prepared by neutralizing commercial "isosebacic" acid with aqueous sodium hydroxide:

| | Percent by weight |
|---|---|
| Sodium "isosebacate" | 41 |
| Water | 59 |

The undissolved sodium sebacate was separated by filtration and washed three times with saturated sodium chloride in the ratio of about four parts by weight of saturated sodium chloride per part of sodium sebacate. The washes were added to the original filtrate for recovering the isomeric $C_{10}$ acids. The filter cake was dissolved in water and the sebacic acid regenerated upon acidification with hydrochloric acid. The sebacic acid was filtered, washed with water, and dried. The amount of sebacic acid recovered amounted to approximately 80% of sebacic acid present in the original isosebacic.

*Example II*

Example II was similar to Example I save that the sodium isosebacate concentration in the mixture was increased to 50%. At this higher concentration, the separation of sebacic acid was substantially complete, the recovered sebacic acid amounting to approximately 90% of the sebacic acid present in the original isosebacic. The trace amounts of sebacic remaining in the mother liquor can be recovered upon further concentration.

*Example III*

In this example, the potassium salts were employed in place of the sodium salts. The potassium isosebacate content of the mixture prepared was 62%. In this case, the separated potassium sebacate was washed with a 5:1 isopropanol-water mixture instead of with a saturated aqueous solution of a highly soluble inorganic potassium salt. The recovered sebacic acid amounted to about 70% of the sebacic acid present in original isosebacic acid. More complete separation is possible as indicated by further precipitation upon concentrating the original mother liquor.

*Example IV*

In this example, the ammonium salts were employed. The ammonium isosebacate content of the mixture used was about 70%. As with Example III, a mixture of 5:1 isopropanol-water was used as the wash. The recovered sebacic acid in this example amounted to about 80% of the sebacic acid present in the original isosebacic acid. More complete separation is possible as indicated by further precipitation upon concentrating the original mother liquor.

In the above four examples, commercial isosebacic acid was purposely used to show how the sebacic acid remaining in the isomeric $C_{10}$ acids can be removed by the process of this invention. No essential change in the process is necessary when applied to mixed acids having higher sebacic acid content. The following examples on mixtures containing more sebacic acid than found in commercial isosebacic illustrate this point.

*Example V*

A mixture having the following composition was prepared by neutralizing the acids with aqueous sodium hydroxide:

| | Percent by weight |
|---|---|
| Sodium sebacate | 12 |
| Sodium 2-ethyl suberate and 2,2'-diethyl adipate | 28 |
| Water | 60 |

The solution was concentrated by evaporation to the following composition:

| | |
|---|---|
| Sodium sebacate | 18.5 |
| Sodium 2-ethyl suberate and 2,2'-diethyl adipate | 43 |
| Water | 38.5 |

The undissolved sodium sebacate was separated by filtration and washed with a 4:1 isopropanol-water mixture. The sebacic acid was regenerated as described in Example I. The yield of sebacic acid showed that approximately 96% of the sebacic acid was recovered. Analysis of the recovered isomeric $C_{10}$ acids showed sebacic content was less than 2%.

*Example VI*

The mixed $C_{10}$ acids having the same composition used in Example V was neutralized with aqueous potassium hydroxide to give a mixture having the following composition:

| | Percent by weight |
|---|---|
| Potassium sebacate | 15 |
| Potassium 2-ethyl suberate and 2,2'-diethyl adipate | 35 |
| Water | 50 |

The solution was concentrated by evaporation to the following composition:

| | |
|---|---|
| Potassium sebacate | 21.5 |
| Potassium 2-ethyl suberate and 2,2'-diethyl adipate | 50.0 |
| Water | 28.5 |

The undissolved potassium sebacate was separated by filtration and washed with a 10:1 isopropanol-water mixture. The sebacic acid was regenerated as described in Example I. The yield of sebacic acid showed that approximately 85% of the sebacic acid was recovered.

I claim:

1. Process for recovering sebacic acid from "isosebacic acid" which comprises concentrating an aqueous solution of the full alkali metal salt of "isosebacic acid" to precipitate the full alkali metal salt of sebacic acid but discontinuing the concentration before the precipitation of the full alkali metal salt of the isomers of sebacic acid contained in the "isosebacic acid," separating the precipitate from the liquid phase and regenerating sebacic acid from the precipitate.

2. Process according to claim 1 wherein the alkali metal is sodium.

3. Process for separating a full alkali metal salt of sebacic acid from the full alkali metal salt of "isosebacic acid," which comprises mixing the full alkali metal salt of "isosebacic acid" with an amount of water sufficient to dissolve substantially all of the full alkali metal salts of the isomers of sebacic acid contained in the "isosebacic acid" salt but insufficient to dissolve a substantial quantity of the full alkali metal salt of sebacic acid, and separating the undissolved full alkali metal salt of sebacic acid from the dissolved salt.

4. Process according to claim 3, wherein the alkali metal is sodium.

References Cited in the file of this patent

Noller: Chemistry of Organic Compounds, 2nd edition, page 794.